July 19, 1960  K. B. BREDTSCHNEIDER ET AL  2,945,504
VALVE LOCK

Filed Oct. 17, 1956  3 Sheets-Sheet 1

Inventors.
Kurt B. Bredtschneider, &
Frank M. Onak.
By Joseph O. Large Atty.

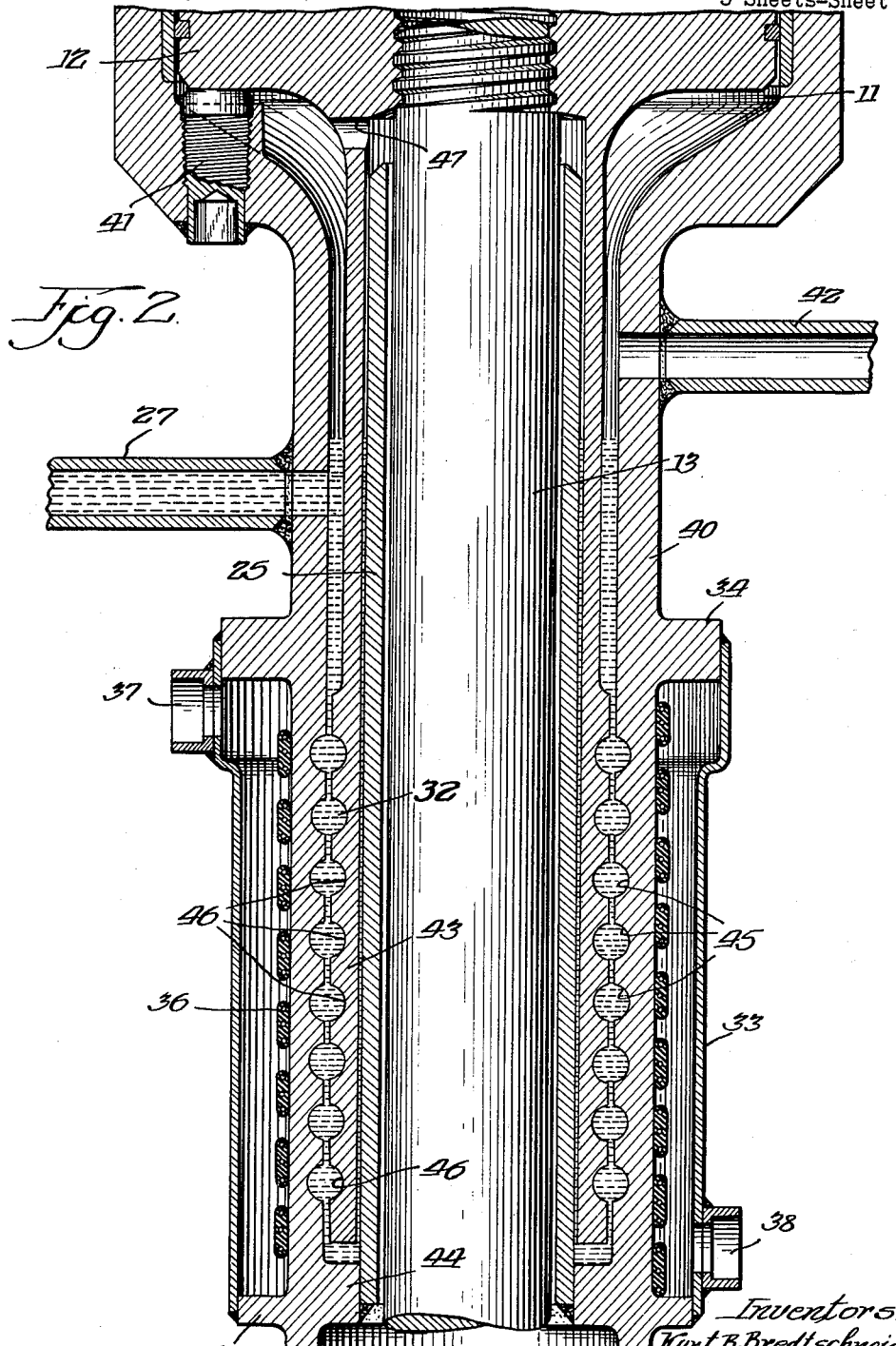

July 19, 1960  K. B. BREDTSCHNEIDER ET AL  2,945,504
VALVE LOCK
Filed Oct. 17, 1956  3 Sheets-Sheet 3
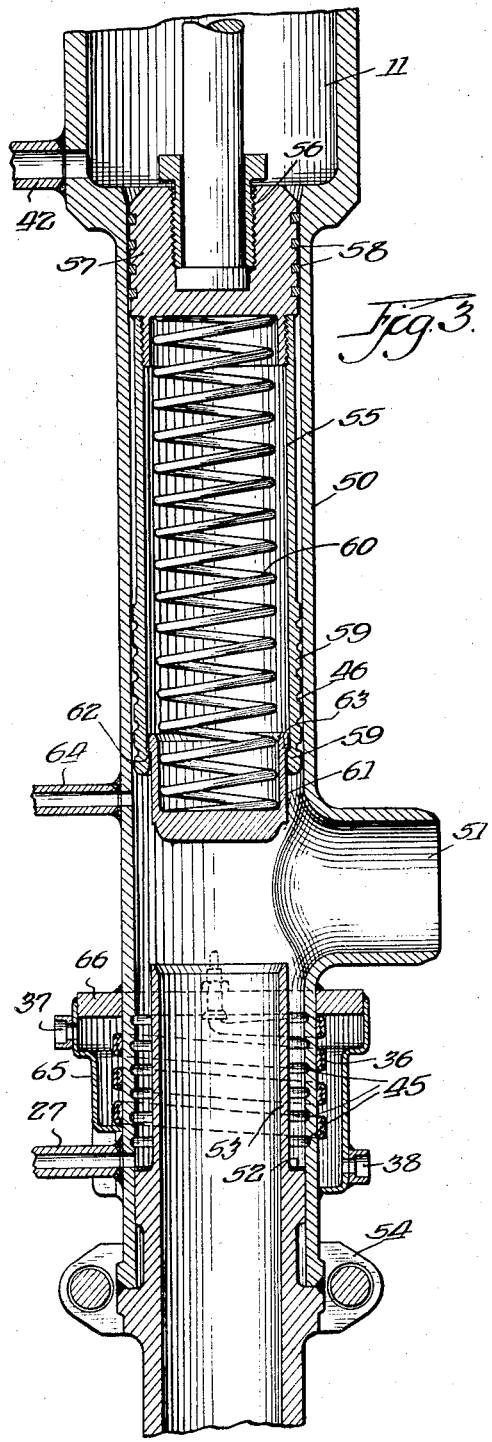
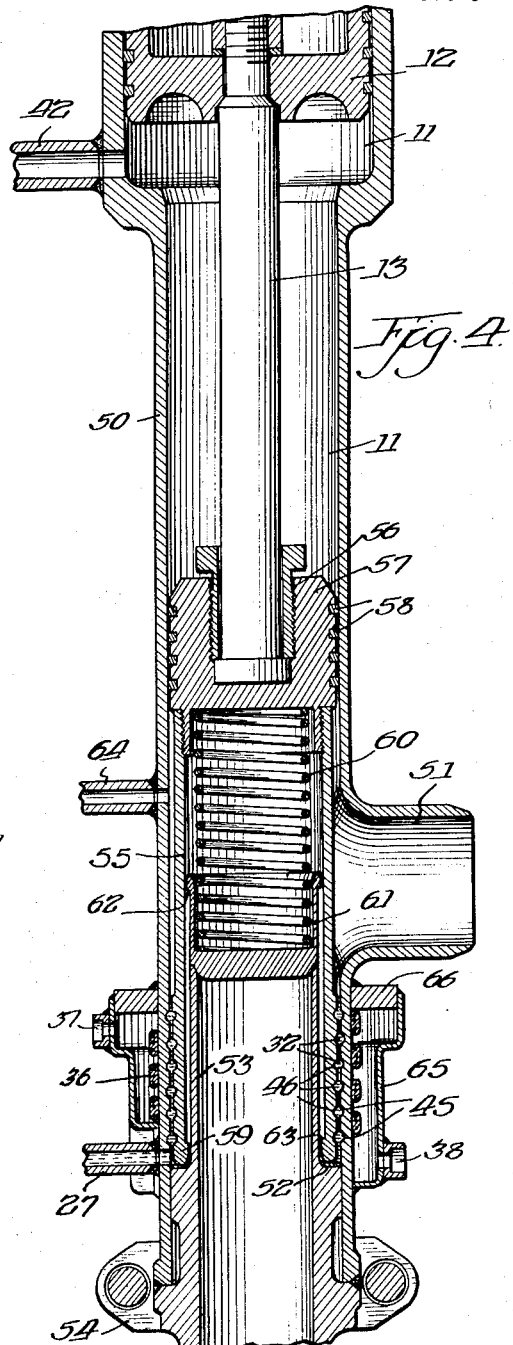
Inventors.
Kurt B. Bredtschneider, &
Frank M. Onak.
By Joseph O. Lange Atty.

United States Patent Office 2,945,504
Patented July 19, 1960

2,945,504

VALVE LOCK

Kurt B. Bredtschneider and Frank M. Onak, Chicago, Ill., assignors to Crane Co., Chicago, Ill., a corporation of Illinois Filed Oct. 17, 1956, Ser. No. 616,488

15 Claims. (Cl. 137—72)

The present invention relates generally to valve locks, and more particularly to an internal valve lock employing solidifiable and fluidizable material to prevent or permit valve closure movement from a predetermined position.

Locking means for holding valves in open or closed position commonly take the form of interengaging mechanisms which require some part to project outwardly of the valve body or casing. While such devices are fairly satisfactory for ordinary use, they will not do where the line fluid is of a dangerous or otherwise deleterious nature and it is therefore desirable to prevent any possibility of leakage out of the valve. The present invention provides a locking arrangement which requires no parts extending through the valve casing and thus allows the casing to be hermetically sealed so that no escape of the line fluid is possible. This is disclosed as accomplished by employing a solidifiable and fluidizable material, preferably with a low expansion factor, disposed between the valve casing or body and the closure-carrying valve stem or a part affixed thereto. Offsets indentations, grooves or like recesses formed in opposed surfaces of the casing and the valve stem part are provided for more secure anchorage of the material when solid. When fluid, the material allows for movement of stem and closure relative to the casing, but when solidified, it prevents such movement either by reason of its adhesion to the parts or by keying the parts against movement by filling the recesses therein, or by a combination of keying and adhesion. Means are provided for heating and/or cooling the material so that its phase may be changed between solid and fluid. In addition, provision is made for subjecting the material in its fluid condition to fluid pressure so that it is held at a predetermined level and cannot escape into portions of the valve or casing either to interfere with proper valve operation or contaminate the line fluid. A reservoir for the material may be provided so that the material may be introduced into and withdrawn from the casing before and after movement of the valve stem and closure. The material may be normally solid, such as a suitable metal, and heated to fluidizing temperature when desired, or may normally be fluid and solidified by cooling.

It will be apparent that the lock of this invention cannot jam, has no moving parts in the usual sense to become worn or break, will not interfere with disassembly in case of damage to the valve replacement of parts, and is proof against failure.

It is accordingly an object of this invention to provide a lock for a valve which operates entirely within the valve and allows hermetic sealing of the valve body.

Another object of the invention is the provision of a valve lock employing a material within the valve body solidifiable to secure the valve stem or other closure-carrying means to the body in a desired locked position and fluidizable to release the parts.

Another object is the provision of a valve lock employing material between the valve casing and the closure-carrying means holding the parts against movement by adhesion thereto when solid and fluidizable to allow movement.

A further object is the provision of a valve lock employing material between the valve casing and closure-carrying means filling recesses therein solidifiable to key the parts against movement and fluidizable to permit movement.

It is another object to provide a valve lock which cannot become jammed.

Another object is the provision of a valve lock which cannot become so interengaged with the valve parts as to prevent or interfere with disassembly thereof in the event of failure of or damage to the valve.

A further object is the provision of a valve lock having no moving parts in the usual sense.

It is also an object of the invention to provide a valve lock which is reliable and substantially failure-proof.

Other and further objects, advantages, and features of the invention will be apparent from the following description taken with the accompanying drawings, in which:

Fig. 2 is a similar view of a part of a valve showing another embodiment of the invention;

Fig. 3 is a longitudinal sectional view through a valve in open condition embodying another form of the invention; and Fig. 4 is a view similar to Fig. 3, but showing the valve in closed and locked condition.

Figure 1:
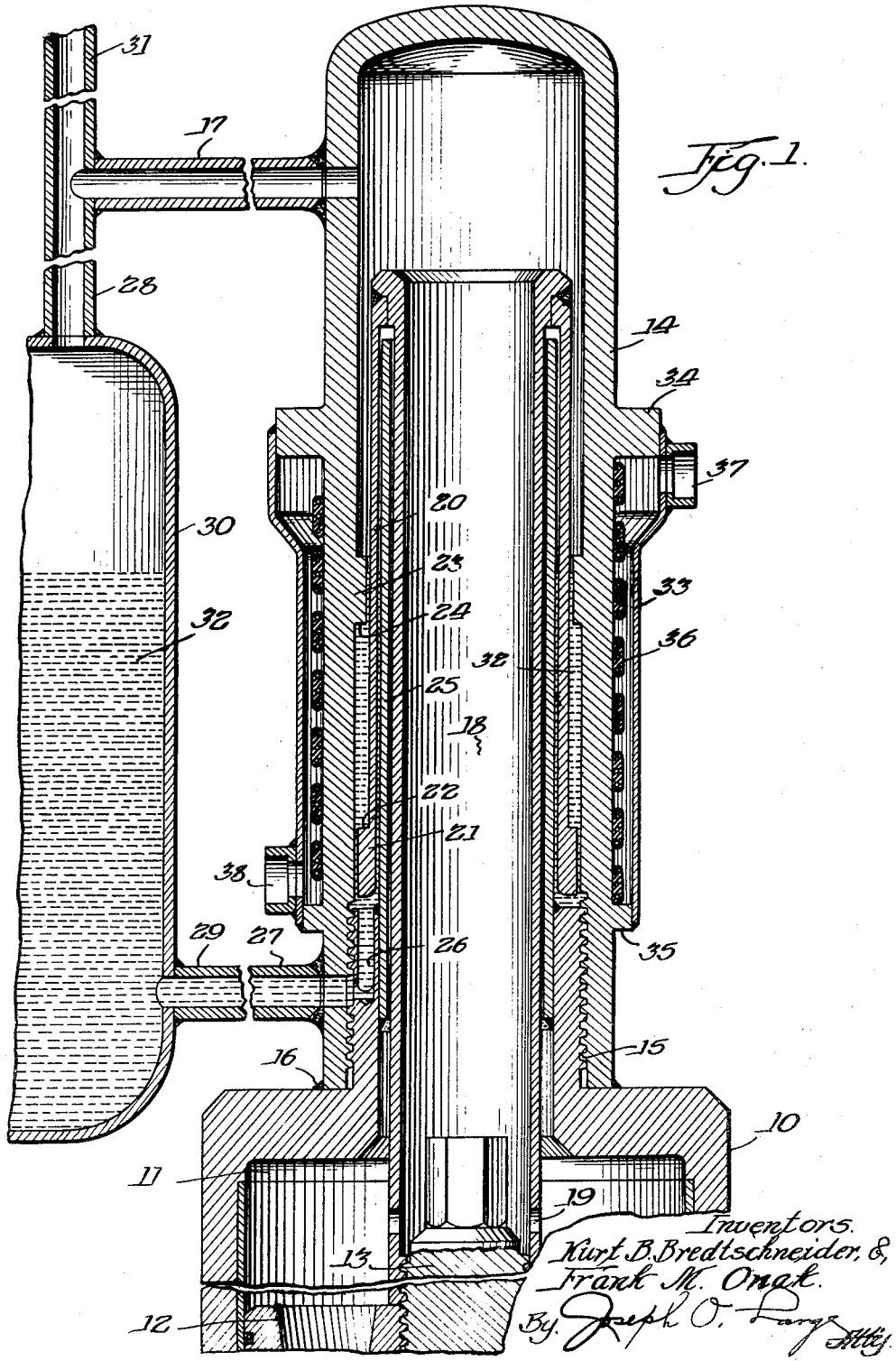
Fig. 1 is a longitudinal sectional view of a portion of a valve construction embodying one form of the invention.

Referring first to Fig. 1 of the drawings, there is shown a portion of a valve comprising a casing 10 defining a cylinder 11 in which works a piston 12 which has secured thereto a valve stem 13 carrying any suitable closure, not shown. Movement of the piston thus causes the valve stem to engage the closure on or withdraw it from a suitable valve seat to open or close the valve, the valve seat not being shown in this instance, since it may be of any type appropriate for the closure. An extension 14 of the casing 10 is shown as threadedly connected thereto as at 15, with a weld 16 hermetically sealing the joint therebetween, and has a fluid connection 17 in communication therewith for passage of piston operating fluid therethrough to the cylinder 11. It will be understood that a similar connection is made to the other end of the cylinder for admission and withdrawal of operating fluid to the other side of the piston 12, so that the piston may be moved in either direction.

On the stem 13 is fixed a tubular stem extension 18 which projects into the casing extension 14 and has apertures 19 adjacent the piston 12 to provide for the passage of the piston operating fluid into the cylinder 11. Welded or otherwise secured to the end of the stem extension 18 is a tubular skirt member or locking portion 20 surrounding the extension 18 and spaced slightly therefrom. The locking portion has its outer surface offset or indented for at least an appreciable distance from adjacent its end remote from its connection to the stem extension 18, forming a relative enlargement 21 at this end projecting radially outwardly and providing a shoulder 22. The inner face of the casing extension is also indented or offset to provide a radially inwardly projecting portion or relative enlargement 23 intermediate the enlargement 21 and the end of the stem extension to define a shoulder 24 generally opposed to the shoulder 22, the shoulders extending in radially overlapped relation although spaced from each other. A tubular sleeve or baffle 25 extends from the casing 10 about the stem extension 18 within the space between the extension 18 and the locking portion 20, defining with the inner face of the casing extension 14 an annular pocket in which the locking portion 20 is received. From the bottom of this pocket, there extends a passage 26 which communicates through the wall of the casing extension 14 with a fluid connection 27. The fluid connections 17 and 27 communicate through suitable conduits 28 and 29, respectively, with the upper and lower portions of a closed container or reservoir 30, and the connection 17 and conduit 28 are also in communication with a conduit 31 leading from any suitable source, not shown, of piston operating fluid under desired pressure. Suitable valve means, not shown, are employed to control flow through the several conduits. The reservoir may have fill means and drain means at its upper and lower portions respectively which when not actually in use close off the reservoir.

Within the reservoir is contained a supply of a material 32 employed to lock the valve in a predetermined position. The material 32 is maintained in fluid condition in the reservoir and conduit 29, suitable heating means or the like being employed if desirable or necessary for this purpose. Such means might, for example, constitute a heating element or coil, not shown, disposed within or surrounding the reservoir 32, and the conduit 29 if necessary. The material in fluid condition may be introduced through the conduit 29, connection 27 and passage 26 into the pocket about the baffle, filling the chamber defined between the casing extension 14 and the locking portion 20 and the shoulders 22 and 24 thereon. A slight space is left between the enlarged portions 21 and 23 and the surfaces opposed thereto to serve as a passage for flow of material to this chamber and preferably somewhat beyond or above it. About the exterior of the casing extension 14 in position to surround the material-receiving chamber within the casing extension is disposed a jacket 33, which conveniently may consist of a suitable shell welded to exterior circumferential flanges 34 and 35 of the casing extension. Within the jacket is disposed an electrical heating element 36 coiled about the casing extension with terminals extending through one of the flanges for connection to any appropriate electrical source. The jacket is also provided with suitable inlet and outlet connections 37 and 38 for circulation of a cooling fluid therethrough, which may be supplied from any suitable source, not shown.

In Fig. 1, the valve is shown locked in the desired position, in this instance the closed position, the piston 12 and stem 13 having been moved downwardly to operate the closure means to shut off flow through the valve. Of course, the valve might be arranged to be opened by downward stem movement. The material 32 in fluid condition is then introduced into the pocket between the baffle 25 and the wall of the casing extension 14, by suitable manipulation of the valve means provided in the conduits 17, 28 and 29, and the material in the chamber between the locking portion 20 and casing extension 14 is solidified. A solid ring is thus provided between the shoulders 22 and 24 which holds the locking portion and therefore the stem extension 18, piston 12, and stem 13 and the closure carried thereby against movement from the closed position. Thus accidental opening or closing of the valve, as by failure or release of the fluid pressure acting to hold the piston and stem in the desired position, which otherwise might allow movement of the piston, stem and closure member, cannot occur. The material 32 may have little or no adhesion to the casing 10 and locking portion 20, in which case it acts only as a key in preventing movement of the closure-carrying means; or it may have such adhesion that the indenting of the casing and locking portion to provide the shoulders 22 and 24 is not necessary. When it is desired to move the valve from the locked position, in this case to open position, it is first unlocked by making the material 32 in the chamber fluid, so that relative movement between the stem with its closure member and the casing may occur. The material 32 is then withdrawn as by operation of the valve means in the conduits 28 and 29 to allow the fluid pressure acting on the piston 12 to force the fluid material from the casing into the reservoir, the latter having a venting valve to relieve the pressure. The valve may then be opened by relative increase of the fluid pressure on the lower side of the piston over that acting on the upper side, as will be obvious. It is to be understood that if desired, the reservoir 30 may be dispensed with, and instead of withdrawing and introducing the fluid material each time the valve is opened or closed, a supply of the material may be maintained in the annular pocket provided by the baffle 25, and merely solidified or fluidized when desired. It will be noted that the space between the baffle 25 and the stem extension 18 is subject to the fluid pressure within the cylinder 11, and that the space between the locking portion 20 and the wall of the casing extension 14 is also subject to this same pressure, so that material in fluid state will be maintained at a common level on both sides of the locking portion 20. In the same way, fluid material 32 in the reservoir is maintained at the same level as the material within the casing because of the subjection of the interior of the reservoir to the pressure of the piston operating fluid, through the conduit 28. The level of the material may thus be maintained at any desired predetermined level and any possibility of its flowing past or about the baffle 25 into contact with the valve parts or line fluid is eliminated.

In Fig. 2, there is shown a valve similar to that illustrated in Fig. 1, and substantially identical parts are designated by the same reference numerals in both figures. The valve comprises a body or casing 40 with an enlarged portion defining a cylinder 11 in which works a piston 12 from which extends a valve stem 13, substantially as in the case of the valve of Fig. 1. An adjustable stop 41 is provided to limit the downward or closing movement of the piston. A fluid connection 42 leading from a suitable source of fluid under pressure opens into the casing in communication with the lower end of the cylinder 11 for application of fluid pressure to move the piston upward for opening the valve. A similar connection, not shown, such as connection 17 of Fig. 1, is provided opening to the upper end of the cylinder for application of fluid pressure to cause downward movement of the piston. Carried by the stem 13 are closure means, not shown, which shut off flow through the valve upon downward movement of the piston and stem and open the valve upon reverse movement. Of course, the valve might be arranged to open upon downward movement and close upon upward movement of the stem. Fixed on the stem, and in this case shown as formed integral with the piston 12, is a tubular locking portion 43 surrounding and spaced from the stem. The outer surface of this locking portion is spaced slightly from the inner face of the casing so as to define an annular passage therewith. Opening from the casing at a level below the fluid connection 42 is a connection 27 which may lead through suitable valve means and conduit to a reservoir such as the reservoir 30 shown in Fig. 1, with the upper portion of which the fluid connection 42 is also in communication, substantially as in the case of the upper fluid connection 17 shown in Fig. 1.

The casing has an inner projection 44 below the level of the connection 27 from which there extends upwardly a tubular baffle 25 surrounding stem 13 and defining with the inner face of the body or casing an annular space or pocket in which the stem locking portion 43 is receivable. In the inner face of the casing within this pocket, a plurality of longitudinally spaced circumferential grooves 45 are formed, and similar grooves 46 are formed in the outer surface of the locking portion 43. Grooves 45 and 46 in this instance are so arranged that upon movement of the stem to a predetermined position, in this case the position in which the valve is closed by the closure means, the grooves in the casing and locking portion are disposed substantially in opposed relation radially of the stem, so as to define a number of annular chambers each partly within the body and partly within the locking portion, and in communication with the annular passage defined between the locking portion and casing. The material 32 already described in connection with the valve of Fig. 1 is provided to fill these chambers, flowing between the reservoir and the annular pocket provided by the baffle 25 in accordance with the changing of the effective volume of the pocket by the movement of the locking portion, as will be apparent. Upon solidification, the material 32 provides in effect a series of annular keys which hold the locking portion 43, and thereby the stem 13 with its closure and the piston 12, locked against undesired movement from the desired position. When it is desired to open the valve, the material 32 is changed from its solid to a fluid state or phase, so as to offer no substantial opposition or resistance to movement of the locking portion, and the piston may be operated by application of the fluid pressure acting on the piston so as to move the piston and stem to unseat the closure means and thus open the valve. While in the construction as shown, the grooves 45 and 46 are arranged so as to be in opposed relation in the predetermined valve position, this is not necessary to the invention, and the respective series of grooves might be arranged for a staggered relationship of the oppositely facing grooves without affecting the locking. As with the valve of Fig. 1, proper locking may be effected either by the keying action of the solidified material or by its adhesion to the parts, or by a combination of the two.

A jacket 33 is provided surrounding the casing in the area containing the grooves 45, being welded or otherwise secured to the flanges 34 and 35 of the casing. A suitable electrical heating coil 36 is contained within the jacket with its terminals suitably projecting therefrom for connection to a source of electricity, and inlet and outlet connections 37 and 38 are provided for circulating a cooling fluid through the jacket. The material 32 in the annular pocket within the casing may thus have its temperature varied as may be appropriate so as to change its phase between solid and fluid. It will be understood that the reservoir 30 need not be employed if it is not desired. When the reservoir is provided, the fluid pressure acting upon the material in the reservoir and upon the material in the pocket will maintain the material, in its fluid state, at a desired common level within the reservoir and casing. It will be noted that the locking portion 43 is apertured as at 47 to provide communication between the spaces on either side thereof, so that any material within the pocket between the locking portion and the baffle is subjected to the same pressure as the material in the annular passage and in the several chambers. The baffle, it will be understood, is formed to extend above the level at which the material is maintained.

It will be evident that the chamber-defining indentations of the valve of Fig. 1 may be employed in the valve of Fig. 2 instead of the grooves, and similarly grooves or other recesses may be substituted for the offsets or indentations of the valve of Fig. 1.

Figs. 3 and 4, in which parts substantially the same as those shown in Figs. 1 and 2 are designated by the same reference numerals, illustrate the open and closed positions, respectively, of a valve comprising a body or casing 50 having an enlarged portion which defines a cylinder 11. In the cylinder is a piston 12 movable by fluid pressure applied to opposite sides thereof, a fluid connection 42 being shown at the lower portion of the cylinder, and a similar connection, not shown, such as the fluid connection 17 shown in Fig. 1 being provided at the upper portion of the cylinder. A valve stem 13 is threadedly or otherwise suitably connected to the piston 12, and carries closure means more fully described hereafter. The body or casing has an inlet port 51 opening thereinto. Within the casing is a valve seat 52 about an axial tubular baffle 53 spaced from the casing providing an outlet passage communicating through the valve body with the inlet port. The baffle also defines with the seat and the inner face of the body adjacent thereto an annular space or pocket which is open to the interior of the body and thus to the inlet port. The baffle 53 may be formed integrally as a reduced extension of a separate tubular portion of the casing telescoping therein, and which may be collared for abutting engagement with the casing and secured thereto by a split clamping ring 54 or the like, as will be clear from the drawings. The seat 52 may be an annular insert in a shoulder of the separate casing portion, and forms the bottom of the pocket. The inner face of the body within the pocket is provided with the longitudinally spaced circumferential grooves 45 already disclosed in connection with the valve of Fig. 2.

Engageable with the seat 52 is a tubular closure member 55 securely attached on the stem 13 in any suitable manner, as by a threaded connection such as shown at 56 between a head portion 57 of the closure and a stem nut, thus in effect forming an extension of the stem. The head portion 57, carrying piston rings 58 or the like for engagement with the interior of the body or casing by which the closure is guided in movement with the stem, is shown as a separate piece threadedly or otherwise firmly secured to the closure proper. The intermediate portion of the closure is reduced so as to provide an appreciable space between itself and the interior surface of the casing which serves as a fluid passage when the closure is moved to seated position. Adjacent its free end the closure has an enlarged locking portion 59 defining a narrower space with the interior of the casing which serves as a passage for the material 32 when the closure is seated. In the outer surface of the locking portion 59 are provided a series of circumferential longitudinally spaced grooves 46 which cooperate with the groove 45 in the inner face of the body about the baffle 53 to define chambers when the closure 55 is disposed in the annular pocket about the baffle. The locking portion in this case is formed as part of the closure, but is also in effect on and a part of the stem. Within the closure is disposed a spring 60 bearing at one end against the head 57 and at the other against a cup-shaped closure disk 61 having an outer peripheral shoulder 62 for engagement with an inner shoulder 63 formed on the closure 55 to retain the disk against movement out of the closure. The disk 61 is normally held projecting out of the closure by the pressure of the spring, but may slide longitudinally within the closure.

In downward movement of the closure, the disk 61 comes into closing relation with the mouth of the outlet passage defined by the baffle 53 to cause preliminary throttling and shut-off of flow through the valve. By reason of the yieldable mounting of the disk, it is held on the baffle mouth and moves relatively inwardly of the closure while movement of the closure continues until it engages the seat 52 for positive closing of the valve. As shown in Fig. 4, the closure telescopes about the baffle 53, which is formed of slightly smaller diameter than the closure 55. Upon seating of the closure, the material 32 is introduced through the connection 27 under control of any suitable valve means into the space or passage defined between the locking portion 59 of the closure and the inner face of the body, and into the chambers provided by the opposed grooves 45 and 46, so that upon solidification it will key the closure against movement out of its closing position and hold it in such position even upon failure or release of the fluid pressure acting on the piston 12 to hold the valve closed. The arrangement of the grooves need not be such that they come into opposed relation to form chambers when the valve is in the predetermined position in which it is to be locked, and of course grooves or other indentations might be omitted and the adhesion of the material 32 alone relied upon to effect the locking. A fluid connection 64 is provided opening from the body or casing 50 at the location of the fluid passage provided by the reduced intermediate portion of the closure 55 in its seated position and leading to the upper portion of the reservoir through any appropriate valve means, not shown. By means of this connection, the line fluid pressure acting through the port 51 on the material in the chambers also acts on the material in the reservoir so that in the fluid condition of the material it is maintained at the common desired level in the reservoir and in the casing, below the mouth of the outlet passage.

If desired, as in the case of the constructions shown in Figs. 1 and 2, the reservoir may be dispensed with, and a quantity of the material maintained in the pocket defined between the baffle 53 and the interior face of the casing. A jacket 65 is provided about the casing at the area of the pocket, which may be provided by a suitable split shell construction welded or otherwise secured to the casing and to a split ring 66 welded about the exterior of the casing. A heating coil 36 is provided in the jacket and arranged for connection to any suitable source of electricity. The jacket has inlet and outlet connections 37 and 38 for circulation of a cooling fluid therethrough as in the case of the constructions shown in Figs. 1 and 2. When it is desired to open the valve, the material 32 is brought to a fluid state and withdrawn into the reservoir, as by closing the connection 64 and relieving the reservoir pressure so that line pressure acting upon the material in the casing will force it into the reservoir. If no reservoir is employed, means may be provided for temporarily shutting off the line pressure through the inlet port 51 until after the closure has been withdrawn from the pocket, so that line fluid pressure will not blow the material out of the pocket. It is to be noted that in this valve the material 32 when solidified serves as a shu-off means additional to the closure 55, as well as locking the closure against movement.

The closure construction of this valve protects the closure 55 and seat 52 against undue wear and erosion by the line fluid. The seat is disposed at the bottom of the pocket provided by the extension or baffle 53, out of the zone of turbulence of the line fluid flowing through the valve. The seating edge of the closure 55 in open position is similarly held withdrawn out of the direct path of the line fluid, in a recess provided by the side wall of the cupped disk 61 and the body wall. During closing of the valve, the closure member is exposed only very briefly to the line fluid because of the action of the disk 61 in throttling the flow before the closure member moves to a position exposed to the force of the fluid entering through the inlet port 51, and in cutting off flow as the closure 55 moves past the port 51 into the pocket and onto the seat 52. In the closed position, of course, there is no flow to cause erosion of either the seat or closure.

While the valve constructions illustrated are all shown as employing a piston carrying a stem for operating the closure means, it is to be understood that this is primarily to provide a hermetically sealed structure preventing any possibility of escape of the line fluid. The present invention may be employed to lock valves provided with other suitable means for operating the closure means.

The material 32 may be any suitable material or mixture of materials, whether normally solid or fluid at the temperatures involved in the operation of the particular valve, which may be changed in phase by a change of temperature through a preferably relatively narrow range. A metal such as bismuth, for example, may be employed, fluidized by heating as by the heating coil 36 when desired, and solidified for locking the valve in the desired position by cooling, either relatively quickly by circulation of a cooling fluid through the jacket 33 or 65 or more gradually simply by radiation and conduction. A liquid, such as water for instance, might be employed, normally fluid at the valve temperature, frozen to solidity by the use of a suitable cooling fluid in the jacket and again fluidized either by heating as by the means disclosed or by allowing its temperature to rise by absorption of heat from the valve. While the material may if desired have a solidification expansion factor substantially zero, as by the employment of a suitable eutectic mixture, so as to avoid expansion which might tend to burst the valve structure and also any shrinkage which might allow looseness between the parts desired to be held against movement, this is not necessary. The material 32 may have a relatively high or a negative expansion upon solidification without causing any difficulty. If the expansion factor is high, the material may readily expand out of the annular flow passage and the chamber or chambers, if any are provided, against the resistance of unsolidified material. On the other hand, if the expansion factor is negative, the material will contract as it solidifies and unsolidified material will flow into the space between the parts to be locked and become solid, until the space is filled with solid material to provide a frozen lock.

The valve of Fig. 1 employs radially overlapping projections 21 and 23 on the valve stem locking portion and the casing to serve as end walls for a single annular chamber the side walls of which are defined by the indented surfaces of the casing and locking portion when in radially opposed relation. In the valves of Figs. 2 and 3, a series or plurality of grooves 45 and 46 are employed to provide a number of chambers in the desired valve position. Instead of the grooves, other indentations, offsets, or recesses might be used to form the material-containing chambers, or, as already pointed out merely to provide offset or staggered anchoring recesses for the material 32. Also as previously noted, the recesses may be omitted altogether under proper conditions. Such offsets or indentations in any of the valve constructions disclosed need not be annular to achieve the results desired therefrom, as will be obvious. In the valve of Fig. 1, the material 32 locking the parts is in compressional relation between the shoulders 22 and 24, and a plurality of longitudinal spaced chambers is therefore not ordinarily necessary, although it may be provided, to achieve the necessary strength for holding the parts against movement. In the valves of Figs. 2 and 3, the material 32 in the chambers is in shear, and accordingly a number of longitudinally spaced chambers may be desirable to assure that the forces which may act on the lock will not break it, although a plurality of chambers spaced longitudinally of the casing and stem may be unnecessary, depending upon the shear strength and adhesion of the material 32 employed and the forces which may act on the lock. The arrangement of recesses or indentations may thus be varied, or recesses may be dispensed with, to suit particular conditions.

It should be clear that the invention may be used not only to hold the valve in a single predetermined open or closed position, but to lock it in the opposite or an intermediate position.

While the closures have been referred to as being moved up or down, and other references have been made to the valves based upon the vertical positioning thereof as shown in the drawings, it is to be understood that this is for convenience in description only, and that the lock of this invention may be employed with valves in various positions and is not limited to vertically arranged valves.

It is to be understood that the several embodiments of the invention shown are illustrative applications of the principle involved, and that many changes and modifications may be made without departing from the spirit and scope of the invention, which is not intended to be limited except as required by the appended claims.

We claim:

1. In a valve comprising a valve body, valve seat means in said body, a longitudinally reciprocable valve stem extending in the body, and valve closure means carried by said stem for movement into and out of closing relation with said seat means, a tubular baffle extending in the interior of the body spaced from the inner body face to define a retaining space, a tubular locking portion fixed on the stem movable in said space having its outer surface spaced inwardly of the inner face of the body for defining a passage therewith, a plurality of indentations in the outer surfaces of said locking portion and inner body face arranged for disposition of at least one indentation in said outer surface in substantially radial opposition to a body indentation in predetermined position of the closure to define at least one chamber partly in the body and partly in the locking portion open to said passage, material in the passage and each said chamber solidifiable to hold the locking portion to the body against closure movement from said position and fluidizable to allow closure movement, means to vary the temperature of said material for changing the phase thereof between solid and fluid, a closed container for said material in fluid state, means connecting said container and said retaining space for flow therebetween of said material in fluid phase, and means for applying common fluid pressure to the interior of said container and the retaining space to maintain the fluid material at a predetermined level in said space.

2. In a valve comprising a valve body, valve seat means in said body, a valve stem movable in the body, and valve closure means carried by said stem for movement into and out of closing relation with said seat means, a tubular baffle within the body spaced from the inner body face to define a retaining space therewith, a tubular locking portion fixed on the stem movable in said space having the outer surface thereof spaced inwardly of the inner body face to define a passage therewith, recesses in said outer surface and inner face, material in said passage anchoring in said recesses solidifiable to hold the locking portion fixed against movement to prevent closure movement and fluidizable to allow such movement, means to vary the temperature of said material for changing the phase thereof between solid and fluid, a closed container for the material in fluid state, means connecting said container and retaining space for flow therebetween of the material in fluid phase, and means for applying common fluid pressure to the interior of the container and the retaining space to maintain the fluid material at a predetermined level in said space.

3. In a valve comprising a valve body, valve seat means in said body, a valve stem movable in the body, and valve closure means carried by said stem for movement into and out of closing relation with said seat means, a tubular baffle within the body spaced from the inner body face to define a retaining space, a tubular locking portion fixed on the stem movable in said space having its outer surface spaced inwardly of the inner body face for defining a passage therewith, material in said passage solidifiable to hold the locking portion fixed against movement relative to the inner face of the body and fluidizable to allow such movement, means to vary the temperature of said material for changing the phase thereof between solid and fluid, a closed container for the material in fluid state, means connecting said container and retaining space for flow therebetween of said material in fluid phase, and means for applying common fluid pressure to the interior of the container and the retaining space to maintain the fluid material at a predetermined level in said space.

4. In a valve comprising a valve body, valve seat means in said body, closure means operable to open and close said seat means, and closure operating means movable in the body connected to said closure means for movement thereof between opening and closing positions, a locking portion on said operating means having an outer surface spaced inwardly of the inner face of the body for defining a passage therewith, indentations in said outer surface and inner body face, material in said passage anchoring in said indentations solidifiable to hold the locking portion and thereby the closure means against movement relative to the body and fluidizable to permit such movement, means to vary the temperature of said material for changing the phase thereof between solid and fluid, and means communicating with said passage for introduction into and reception from the passage of the material in fluid state.

5. A valve comprising a valve body, valve seat means in said body, closure means for said seat means, closure operating means movable in the body connected to said closure means for movement thereof between open and closed positions, locking portions on the body and operating means disposed in substantially opposed relation in predetermined position of the closure means, a passage defined between opposed surfaces of the locking portions in said position and open to pressures from opposite ends thereof, locking material in said passage solidifiable to hold the locking portions against movement from said opposed relation and fluidizable to permit such movement, and means for equalizing pressure inwardly and outwardly of said operating means locking portion in said position to prevent ejection of said material in fluid phase from the passage.

6. In a valve comprising a valve body, valve seat means in said body, longitudinally reciprocable valve stem means extending in the body, and valve closure means carried by said stem means for movement into and out of closing relation with said seat means, a tubular baffle on the interior of the body defining an annular pocket with the inner face of the body, an extension on said stem means projecting through said baffle, a tubular lock portion fixed on said extension extending in said pocket having its outer surface spaced from said inner body face in the pocket to define a passage therewith, offsets in said outer surface and inner face located for disposition substantially in radial opposition in predetermined position of the stem means to define at least one chamber partly in the body and partly in the locking portion communicating with said passage, material in the passage and each said chamber solidifiable to hold the locking portion locked to the body for preventing movement of the stem means from said position and fluidizable to allow such movement, means to vary the temperature of said material for changing the phase thereof between solid and fluid, a closed container for the material in fluid state, means connecting said container and pocket for introduction into and withdrawal from the pocket of fluid material, and means for applying a common fluid pressure to the interior of the container and the pocket to maintain the fluid material at a predetermined level in the pocket and prevent flow thereof about the baffle.

7. In a valve comprising a valve body, valve seat means in said body, valve stem means movable in the body, and valve closure means carried by said stem means for movement thereby into and out of closing relation with said seat means, a locking portion on said stem means having an outer surface spaced from the inner face of the body in predetermined position of the stem means, oppositely extending projections on said outer surface and inner face in radially overlapping longitudinally spaced relation, at least one chamber defined between the body and locking portion in said position by overlappingly related projections, material substantially filling each said chamber solidifiable to hold the locking portion secured to the body for preventing movement of the stem means from said position and fluidizable to allow stem means movement, and means to change the temperature of said material for varying the phase thereof between solid and fluid.

8. In a valve comprising a valve body, valve seat means in said body, valve stem means movable in the body, and valve closure means carried by said stem means for movement into and out of closing relation with said seat means, a baffle within the body defining a pocket with the inner face of the body open to pressure in the body, an extension on the stem means within the body, a locking portion fixed on said extension in surrounding relation thereto engaging within said pocket having an outer surface spaced from said inner body face in predetermined position of the stem means and an inner surface spaced from said baffle, material substantially filling the space between said outer surface and inner face solidifiable to hold the locking portion secured to the body for preventing movement of the stem means from said position and fluidizable to permit stem means movement, means for equalizing pressure in the pocket on both sides of the locking portion, and means to vary the temperature of said material for changing the phase thereof between solid and fluid.

9. A valve comprising a valve body, valve seat means in said body, valve closure means operable to open and close said seat means, closure operating means movable in the body connected to said closure means for movement thereof between opening and closing positions, means within the body defining a pocket therewith open to pressures in the body, an extension fixed on said operating means having a locking portion engaging within said pocket, locking material in the pocket solidifiable to hold the locking portion secured to the body for preventing movement of the operating means and fluidizable to permit such movement and means for equalizing pressure in the pocket about the locking portion to prevent ejection of the material in fluid phase.

10. In a valve comprising a body, valve seat means in said body, a longitudinally movable valve stem extending in the body, and closure means carried by said stem for movement into and out of closing relation with said seat means, a tubular baffle on the interior of the body defining an annular pocket therewith extending about the stem, a tubular locking portion on and surrounding the stem received in said pocket having its outer surface spaced from the inner face of the body within the pocket in predetermined position of a stem to define a passage, a plurality of indentations in the inner face of the body within the pocket and the outer surface of the locking portion at least certain of which extend in substantially opposed relation radially of the stem in said position of the stem to define at least one chamber partly in the body and partly in the locking portion open to said passage, material in said pocket substantially filling the passage and each said chamber solidifiable to lock the locking portion to the body against stem movement from said position and fluidizable to permit stem movement, means to vary the temperature of said material for change of phase thereof between solid and fluid, a closed container for the material, means connecting the container and pocket for introduction into and reception from the pocket of the material in fluid condition, and means for applying common fluid pressure to the interior of the container and the pocket to maintain the fluid material at predetermined level in the pocket and prevent flow thereof about said baffle.

11. In a valve comprising a body, valve seat means in said body, valve stem means movable in the body, and closure means carried by said stem means for movement into and out of closing relation with said seat means, a tubular locking portion on and extending about the stem means having an outer surface adjacent the inner face of the body to define therewith in predetermined position of the stem means, a passage open to pressure at opposite ends thereof, a plurality of indentations in the inner body face and outer locking portion surface open to said passage, material in the passage anchoring in said indentations solidifiable to lock the locking portion to the body for prevention of stem means movement from said position and fluidizable to permit stem means movement, means for varying the temperature of said material to change the phase thereof between solid and fluid, and means providing equal pressure on opposite faces of the locking portion for retaining the material in fluid state in the passage.

12. In a valve comprising a body, valve seat means in said body, valve stem means movable in the body, and closure means carried on said stem means for movement thereby into and out of closing relation with said seat means, a locking portion on the stem means and extending thereabout having a surface in spaced relation to the inner face of the body in predetermined position of the stem means to define a passage open to pressure at opposite ends thereof, material in said passage solidifiable to lock the locking portion to the body for preventing movement of the stem means from said position and fluidizable to permit such movement, means for balancing pressure on the material in fluid phase in the passage, and means for varying the temperature of said material to change the phase thereof between solid and fluid.

13. A valve comprising a body, valve seat means in said body, valve stem means movable in the body, closure means carried by said stem means for movement thereby into and out of closing relation with said seat means, a locking portion on the stem means having a surface extending adjacent the inner face of the body in predetermined position of the stem means to define a passage open to pressure at opposite ends thereof, locking material in said passage solidifiable to hold the locking portion secured to the body for preventing movement of the stem means from said position and fluidizable to permit stem means movement, and means for balancing pressure on the material in the passage to prevent ejection thereof in the fluid phase.

14. In a valve comprising a body, an annular valve seat in said body, a longitudinally movable valve stem extending in the body, and an inlet port opening into the body, an axial tubular extension of the inner peripheral portion of said seat providing an outlet passage communicating with said inlet port and defining with the seat and the inner face of the body adjacent thereto an annular pocket open to the inlet port, a tubular closure fixed on the stem telescoping about said extension and engaging in said pocket and closing on the seat in closing position of the stem, said closure having an outer surface defining a passage with said inner body face, a disk resiliently mounted on the stem relatively movable inwardly and outwardly of the closure engaging on the end of said extension in closing movement of the stem to close said outlet passage, a plurality of indentations in said inner body face within the pocket and the outer closure surface at least certain of which extend substantially in radially opposed relation in said stem position to define at least one chamber partly in the body and partly in the closure open to said passage, material substantially filling each said chamber solidifiable to lock the closure to the body against stem movement from closing position and fluidizable to permit opening movement, a closed reservoir for said material, means for varying the temperature of the material to change the phase thereof between solid and fluid, means connecting said reservoir and pocket for introduction into and withdrawal from said passage and each said chamber of the material in fluid condition, and means placing the reservoir in communication with the inlet port for application of line fluid pressure to the fluid material in the reservoir and passage to maintain the material at a predetermined level.

15. In a valve comprising a body, inlet port means opening into said body, annular valve seat means in the body, and valve stem means movable in the body, an axial tubular extension of the radially inner portion of said seat means providing an outlet passage in communication through the body with said inlet port means and defining with the seat means and the inner face of the body portion adjacent thereto a space open to the body interior, a tubular closure secured on said item movable thereby into closing position on the seat telescoping about said extension in said space and having an outer surface defining a fluid passage with said inner body face in said closing position, a yieldably mounted member projectable from said closure engaging the end of said extension to close said outlet passage upon closing movement of the closure, indentations in said outer closure surface and inner body face, material in said space substantially filling the fluid passage anchoring in said indentations solidifiable to lock the closure to the body against movement from said position and fluidizable to permit such movement, and means for varying the temperature of said material to change the phase thereof between solid and fluid.

References Cited in the file of this patent

UNITED STATES PATENTS

| | | |
|---|---|---|
| 960,912 | Heany | June 7, 1910 |
| 1,223,736 | Rose | Apr. 24, 1917 |
| 1,292,603 | Hohman | Jan. 28, 1919 |
| 1,308,262 | Sipher | July 1, 1919 |
| 2,830,620 | Shuptune | Apr. 15, 1958 |